US011072441B2

(12) United States Patent
Cherrette

(10) Patent No.: US 11,072,441 B2
(45) Date of Patent: Jul. 27, 2021

(54) STACKABLE SPACECRAFT

(71) Applicant: NORTHROP GRUMMAN SYSTEMS CORPORATION, Falls Church, VA (US)

(72) Inventor: Alan R. Cherrette, Torrance, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 897 days.

(21) Appl. No.: 15/449,368

(22) Filed: Mar. 3, 2017

(65) Prior Publication Data

US 2018/0251238 A1 Sep. 6, 2018

(51) Int. Cl.
| B64G 1/10 | (2006.01) |
| B64G 1/64 | (2006.01) |
| H01Q 1/28 | (2006.01) |
| H01Q 19/13 | (2006.01) |
| H01Q 21/28 | (2006.01) |
| H01Q 19/19 | (2006.01) |
| H01Q 3/26 | (2006.01) |
| H01Q 15/16 | (2006.01) |
| B64G 1/00 | (2006.01) |

(52) U.S. Cl.
CPC ............. B64G 1/10 (2013.01); B64G 1/64 (2013.01); B64G 1/641 (2013.01); H01Q 1/288 (2013.01); H01Q 3/26 (2013.01); H01Q 15/16 (2013.01); H01Q 19/13 (2013.01); H01Q 19/19 (2013.01); H01Q 21/28 (2013.01); B64G 1/002 (2013.01); B64G 1/1007 (2013.01); B64G 2001/643 (2013.01)

(58) Field of Classification Search
CPC .................. B64G 1/641; B64G 2001/643
See application file for complete search history.

(56) References Cited

U.S. PATENT DOCUMENTS

| 3,420,470 A | 1/1969 | Meyer |
| 3,532,299 A | 10/1970 | Williamson et al. |
| (Continued) | | |

FOREIGN PATENT DOCUMENTS

| DE | 28 50 920 A1 | 6/1979 |
| DE | 30 02 551 A1 | 7/1981 |
| (Continued) | | |

OTHER PUBLICATIONS

Surrey, Satellite Technology: Telecommunications & Navigation Platforms, Dec. 15, 2015, 4 pgs. http://www.sst-us.com/divisions/telecommunications-navigation/geo-platforms.

(Continued)

*Primary Examiner* — Joseph W Sanderson
(74) *Attorney, Agent, or Firm* — John A. Miller; Shumaker, Loop & Kendrick, LLP

(57) ABSTRACT

A three-axis spacecraft including a spacecraft body including first and second opposing radiator/equipment panels, first and second opposing mounting panels, an earth deck and a zenith deck. The zenith deck faces the Earth when the spacecraft is on orbit and the first and second mounting panels face an east and west direction relative to the Earth when the spacecraft is on orbit. The spacecraft further includes a mounting cylinder extending through the spacecraft body and out of the first and second mounting panels.

20 Claims, 3 Drawing Sheets

(56) References Cited

U.S. PATENT DOCUMENTS

| | | | |
|---|---|---|---|
| 4,009,851 A | 3/1977 | Cable | |
| 4,664,343 A | 5/1987 | Lofts et al. | |
| 4,834,325 A | 5/1989 | Faget et al. | |
| 4,854,526 A | 8/1989 | Rochefort | |
| 4,972,151 A * | 11/1990 | Rosen | H01Q 3/22 324/354 |
| 5,052,640 A | 10/1991 | Chang | |
| 5,152,482 A | 10/1992 | Perkins et al. | |
| 5,199,672 A | 4/1993 | King et al. | |
| 5,271,582 A | 12/1993 | Perkins et al. | |
| 5,337,980 A | 8/1994 | Homer et al. | |
| 5,344,104 A | 9/1994 | Homer et al. | |
| 5,522,569 A | 6/1996 | Steffy et al. | |
| 5,527,001 A | 6/1996 | Stuart | |
| 5,613,653 A | 3/1997 | Bombled et al. | |
| 5,755,406 A | 5/1998 | Aston et al. | |
| 5,884,866 A | 3/1999 | Steinmeyer et al. | |
| 6,138,951 A | 10/2000 | Budris et al. | |
| 6,196,501 B1 | 3/2001 | Hall et al. | |
| 6,206,327 B1 | 3/2001 | Benedetti et al. | |
| 6,296,206 B1 | 10/2001 | Chamness et al. | |
| 6,416,018 B2 | 7/2002 | DiVerde et al. | |
| 6,504,502 B1 | 1/2003 | Wu et al. | |
| 6,726,151 B2 | 4/2004 | Hebert | |
| 7,780,119 B2 | 8/2010 | Johnson et al. | |
| 8,511,617 B2 | 8/2013 | Caplin et al. | |
| 8,789,797 B2 | 7/2014 | Darooka | |
| 8,915,472 B2 * | 12/2014 | Aston | B64G 1/002 244/171.1 |
| 9,027,889 B2 | 5/2015 | Aston et al. | |
| 9,573,702 B1 | 2/2017 | Jacomb-Hood et al. | |
| 9,902,507 B2 * | 2/2018 | Walker | B64G 1/402 |
| 2012/0068019 A1 * | 3/2012 | Boccio | H01Q 1/08 244/172.6 |
| 2013/0299641 A1 * | 11/2013 | Aston | B64G 1/002 244/171.1 |
| 2014/0239124 A1 | 8/2014 | Aston et al. | |
| 2014/0239125 A1 * | 8/2014 | Aston | B64G 1/002 244/172.3 |
| 2014/0266872 A1 | 9/2014 | Mitola, III | |
| 2016/0318635 A1 * | 11/2016 | Field | B64G 1/641 |
| 2017/0361951 A1 * | 12/2017 | Walker | B64G 1/402 |
| 2018/0111707 A1 * | 4/2018 | Poncet | B64G 1/1085 |
| 2018/0162561 A1 * | 6/2018 | Estevez | B64G 1/002 |
| 2018/0265227 A1 * | 9/2018 | Cheynet De Beaupre | B64G 1/10 |

FOREIGN PATENT DOCUMENTS

| | | | |
|---|---|---|---|
| EP | 2 837 568 A2 | 2/2015 | |
| WO | WO-2016120547 A1 * | 8/2016 | B64G 1/402 |

OTHER PUBLICATIONS

Clark, Stephen, "Spaceflight Now, Photos: Satellites Readied for Tandem Launch on Falcon 9" Posted on Feb. 28, 2015, 6 pgs. http://spaceflightnow.com/2015/02/28/photos-satellites-readied-for-tandem-launch-on-falcon-9/.

Hewitt, John Extreme Tech. "NASA Preps Launch of Four Satellites That Will Finally Suss Out the Origins of Earth's Mysterious Magnetic Field" Nov. 26, 2014, 4 pgs. http://www.extremetech.com/extreme/194922-nasa-preps-launch-of-four-satellites-that-will-finally-suss-out-the-origins-of-earths-mysterious-magnetic-field.

Frick, Warren Shared Ride Opportunities on Orbital Launch Vehicles. Surrey Satellite Technology: Telecommunications & Navigation Platforms, Jun. 11, 2014, 18 pgs. http://www.sst-us.com/divisions/telecommunications-navigation/geo-platforms.

Maly, Joe, "CubeSat Payload Accommodations and Propulsive Adapters" 11th Annual CubeSat Developer's Workshop, Apr. 25, 2014, 17 pgs. http://mstl.atl.calpoly.edu/~bklofas/Presentations/DevelopersWorkshop2014/Maly_CubeSat_Payload_Accommodations.pdf.

Colgate, Stirling, VELA Satellites. Multiwavelength Astronomy, Gamma Ray History, 1 pg. http://ecuip.lib.uchicago.edu/multiwavelength-astronomy/gamma-ray/history/07.html.

Lo, A. et al. "Secondary Payloads Using the LCROSS Architecture" American Institute of Aeronautics and Astronautics, AIAA Space 2008, Conference & Exposition, USA Sep. 11, 2008, 8 pgs.

Christensen, A. et al. "Ice on the Moon? Science Design of the Lunar Crater Observation and Sensing Satellite (LCROSS) Mission" AIAA Space Conference & Exposition, USA Sep. 19-21, 2006, 1 pg.

Spaceflight, "New ICO Global Mobile Satellite System" Spaceflight Now, Jun. 17, 2001, 4 pgs. http://www.spaceflightnow.com/atlas/ac156/010617ico.html.

Makita, Fumio, et al. "Design and Implementation of ICO System" 17th AIAA International Communications Satellite Systems Conference and Exhibit, 1998, Yokohama, Japan, 5 pgs. http://arc.aiaa.org/doi/pdf/10.2514/6.1998-1216.

Maly, Joseph R., et al. "CASPAR: Low-Cost, Dual-Manifest Payload Adapter for Minotaur IV" Csa Engineering Inc Mountain View Ca, 2005, 11 pgs. http://oai.dtic.mil/oai/oai?verb=getRecord&metadataPrefix=html&identifier=ADA443936.

Maly, Joseph, et al. "ESPA Satellite Dispenser for ORBCOMM Generation 2" 27th Annual AIAA/USU Conference on Small Satellites, 2013, 7 pgs. http://digitalcommons.usu.edu/smallsat/2013/all2013/77/.

* cited by examiner

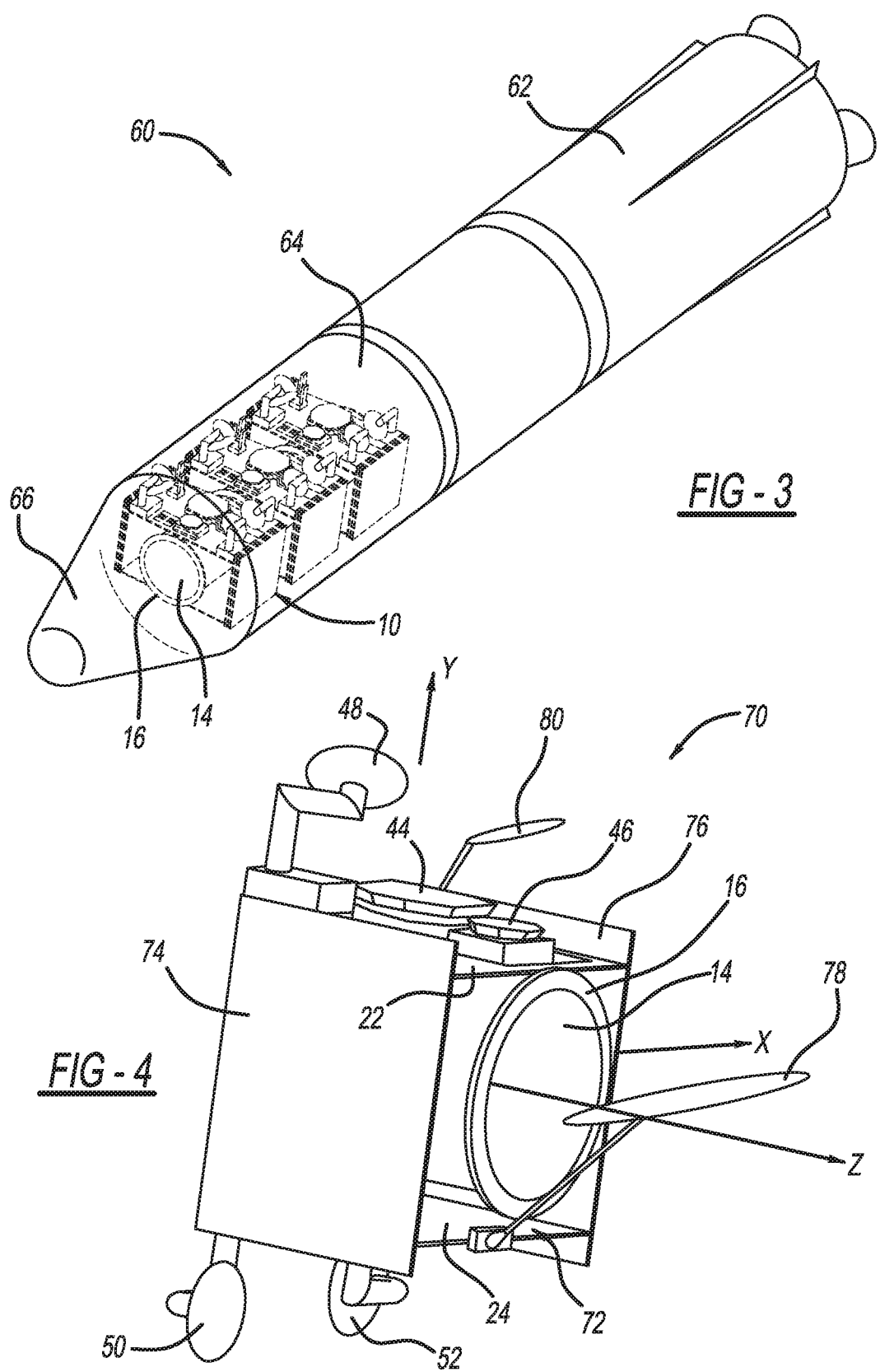

STACKABLE SPACECRAFT

BACKGROUND

Field

This invention relates generally to a stackable spacecraft and, more particularly, to a spacecraft including a central cylinder that extends through the spacecraft in an east/west direction relative to a geostationary orbit orientation of the spacecraft, where the cylinder allows the spacecraft to be coupled to other spacecraft also having central cylinders in a single launch fairing.

Discussion

A vast constellation of spacecraft or satellites orbit the Earth that are employed for many purposes, such as communications purposes, detection purposes, etc., where some of these satellites communicate with each other through satellite cross-link signals and with ground stations through satellite uplink and downlink signals. Some of these satellites are placed in a geostationary orbit above the Earth, where the orbital speed of the satellite and the rotational speed of the Earth cause the satellite to remain above the same location on the Earth.

One specific type of satellite is referred to in the industry as a three-axis satellite, where the satellite body is generally square or rectangular. Solar arrays are often mounted to sides of the satellite that face the north/south direction, referred to as the X-direction, when the satellite is in a geostationary orbit so that when the solar arrays are deployed therefrom they are in a suitable position to be directed towards the sun. The north/south facing sides of the satellite often include a thermal radiator and equipment panel to which various electronics, such as power amplifiers, are mounted to and within the satellite body, where the panels operate as a heat sink and thermal radiator and contain heat pipes to conduct heat. Further, these types of three-axis satellites include a side referred to as the earth deck that faces the Earth in the Y-direction relative to the satellite orbit to which various antennas are mounted, where the opposite surface of the spacecraft is referred to as the zenith deck. In addition, the three-axis satellite includes sides that face the east/west direction, referred to as the Z-direction, relative to the Earth when the satellite is on orbit.

Satellites are constantly being replaced and additional satellites are being added to the constellation as old satellites reach the end of their design lives and new technologies become available. A satellite or spacecraft is typically put into orbit by launching the satellite in a launch fairing on a rocket, where once the rocket reaches a certain altitude, the satellite is released therefrom and on-board propulsion is used to provide the final position of the satellite and the proper orientation relative to the Earth so that the various antennas and other communications devices on the satellite are properly positioned for transmitting and receiving signals.

Launching a spacecraft or satellite in to Earth orbit is expensive, and thus the industry is always attempting to reduce that cost. One way in which the cost of launching a satellite into orbit can be reduced is by launching multiple satellites in a single launch vehicle so that the cost of launching each satellite is spread across all of the satellites. However, as the number of satellites provided in a single launch vehicle goes up, the weight of the launch vehicle also goes up, which also increases the cost.

In order to launch multiple satellites in a common launch vehicle, the satellites need to be mounted to each other or a common structure within the launch vehicle. In one design, multiple satellites are mounted to a common cylindrical dispenser within the launch vehicle that extends through the satellites when in the launch vehicle. Although successful, such a dispenser adds significant weight and volume to the launch vehicle.

It is also known in the art to design a three-axis satellite to have a central cylinder extending therethrough, where that cylinder is coupled to the cylinder of other satellite in the launch vehicle. However, known satellites employing central cylinders orient the cylinder in the Y-direction through the earth deck and the zenith deck of the spacecraft. Because the cylinder extends through the satellite in this direction, there is limited space on the earth deck that could otherwise be used for cross-link antennas, uplink phased arrays (UPA), downlink phased arrays (DPA), gimbal dish antennas (GDA), etc., all of which may be desirable in modern communications geostationary orbiting three-axis satellites. There are also central cylinder stacking-interface related obstructions, which complicate the placement of Earth deck antennas and electronic equipment and interfere with earth deck heat pipe placement and heat removal.

BRIEF DESCRIPTION OF THE DRAWINGS

FIG. 3 is an isometric view of a spacecraft launch vehicle including spacecraft stacked in a launch fairing;

FIG. 4 is an isometric view of another three-axis spacecraft in a deployed configuration;

DETAILED DESCRIPTION OF THE EMBODIMENTS

The following discussion of the embodiments of the invention directed to a three-axis spacecraft including a central stacking cylinder oriented in an east/west direction is merely exemplary in nature, and is in no way intended to limit the invention or its applications or uses. It is noted that the terms spacecraft and satellite are used interchangeably herein.

As will be discussed in detail below, the present invention proposes a stackable three-axis spacecraft that includes a central cylinder extending through the spacecraft in an east/west orientation relative to the orbit attitude of the spacecraft that allows the spacecraft to be coupled to the cylinder of other spacecraft to be stowed in a launch vehicle fairing for launch. The spacecraft also includes an earth deck facing the Y-direction of the spacecraft so that it faces the Earth when the spacecraft is on orbit. By providing the center cylinder in a direction other than the Y-direction of the spacecraft, the earth deck has more real-estate for allowing multiple antennas to be mounted thereto for expanded communications purposes. The spacecraft configuration of the present invention also allows a method of stacking where the earth deck and the zenith deck are free of stacking-interface related obstructions or interference. This allows the earth deck and zenith deck to contain heat pipes that are connected to the north/south thermal radiator and equipment panels. This feature of the present invention is particularly advantageous for earth deck mounted active array antennas because heat generated in the array antennas can be transferred through the earth deck into the north and south thermal radiator and equipment panels where it is radiated into space.

Figure 1:
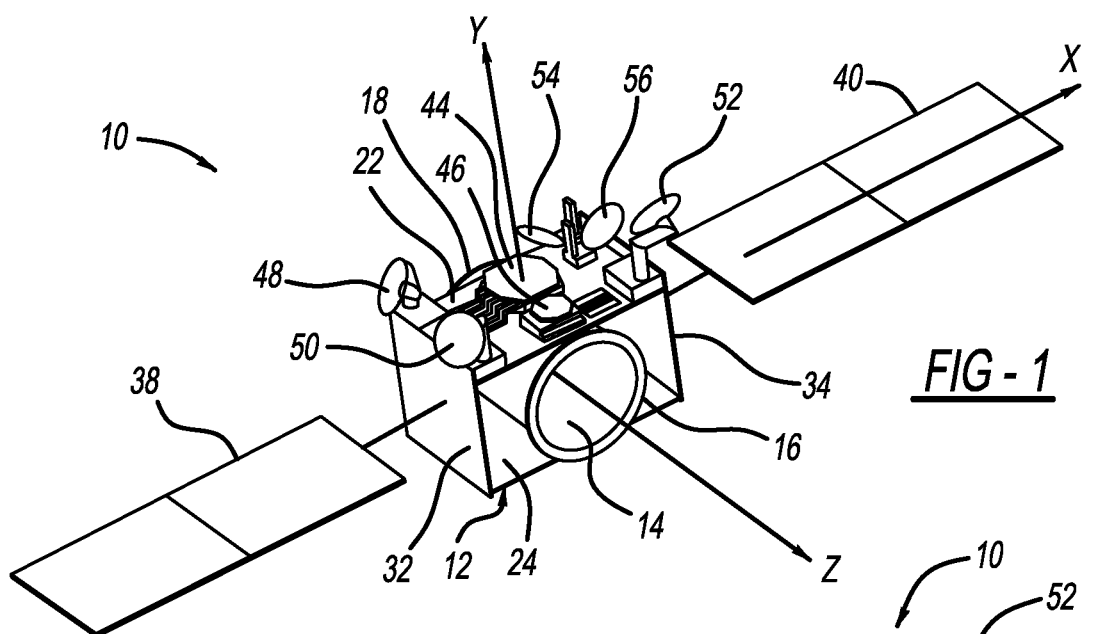
FIG. 1 is an isometric view of a three-axis spacecraft in a deployed configuration and including a center mounting cylinder extending through the spacecraft in an east/west direction.
Figure 2:
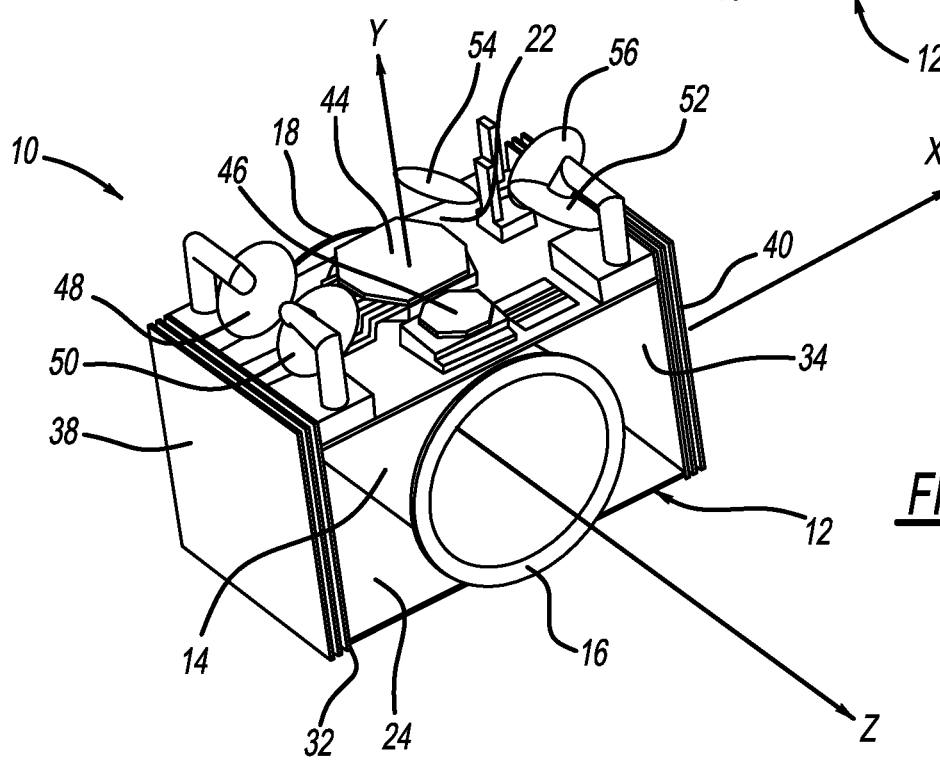
FIG. 2 is an isometric view of the spacecraft shown in FIG. 1 in a stowed configuration.

FIG. 1 is an isometric view of a three-axis spacecraft 10 in a deployed configuration and FIG. 2 is an isometric view of the spacecraft 10 in a stowed configuration. The spacecraft 10 includes a spacecraft body 12 having a general rectangular configuration defining six sides. An X-Y-Z reference frame is shown in FIGS. 1 and 2 relative to the spacecraft body 12 and is intended to represent the axis of the spacecraft 10. Once the spacecraft 10 is on orbit, which will usually be a geostationary orbit, the X-axis will be oriented north and south relative to the Earth, the Z-axis will be oriented east and west relative to the Earth, and the Y-axis will be oriented in to and away from the Earth. As is well understood by those skilled in the art, the enclosure defined by the spacecraft body 12 will house most of the electrical circuits, batteries, fuel tanks, cooling systems, etc., none of which are specifically shown in FIGS. 1 and 2. As will be discussed in detail below, a central mounting cylinder 14 extends through the spacecraft body 12 that is oriented along the Z-axis and extends some distance from the spacecraft body 12, where a mounting flange 16 is provided at one end of the cylinder 14 and a mounting flange 18 is provided at an opposite end of the cylinder 14.

Figure 7:
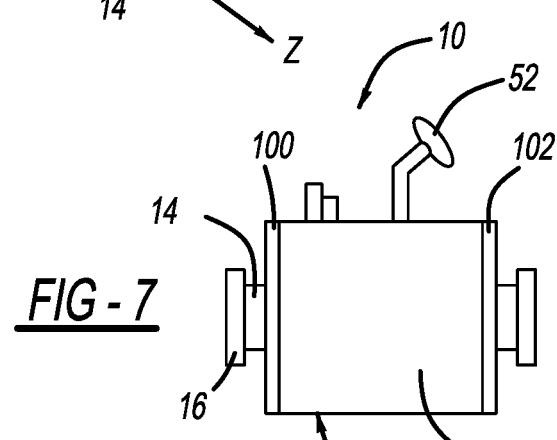
FIG. 7 is a side view of the spacecraft shown in FIG. 1 with a solar panel removed.

The spacecraft body 12 includes a side panel or wall at each of the six sides of the body 12, where one of the side walls facing the Z-direction has been removed so as to expose the cylinder 14 extending through the body 12. In the orientation shown in FIGS. 1 and 2, one of the panels facing the Y-direction is an earth deck 22 that will face the Earth when the spacecraft 10 is on orbit and an opposing panel is a zenith deck 24 that will face away from the Earth. The spacecraft 10 includes a north thermal radiator/equipment panel 32 that defines the north facing panel when the spacecraft 10 is on orbit and a south thermal radiator/equipment panel 34 that defines the south facing panel when the spacecraft 10 is on orbit. Various electrical components (not shown), such as high power amplifiers, are mounted to an inside surface of the panels 32 and 34 within the body 12 and generate significant heat. The outer surface of the panels 32 and 34 is directed towards cooler space, away from sunlight to provide thermal radiative cooling for those components. Depending on the power requirements of the communications system within the spacecraft 10, the size of the spacecraft body 12, etc., the panels 32 and 34 will have a certain size where they may extend some distance beyond the earth deck 22 and the zenith deck 24. The length of panels 32 and 34 can also be extended in the Z-direction. FIG. 7 is a side view of the spacecraft 10 showing mounting panels or side walls 100 and 102 in the Z-direction through which the cylinder 14 extends.

The spacecraft 10 includes two opposing solar panels, specifically a first solar panel 38 mounted to the north panel 32 and a second solar panel 40 mounted to the south panel 34. In one embodiment, the solar panels 38 and 40 are folded into the stowed configuration, where they are positioned adjacent to the panels 32 and 34, as shown. When the solar panels 38 and 40 are deployed, they are able to rotate about the X-axis so they can be oriented perpendicular to the direction of the sun as the spacecraft 10 orbits and the Earth turns to provide maximum power efficiency.

Because the mounting cylinder 14 extends along the Z-axis in the east/west direction and the solar panels 38 and 40 are mounted to the north/south panels 32 and 34, the earth deck 22 is completely open for providing real-estate to which multiple antennas can be mounted, where modern satellites require many communications antennas often operating at different frequency bands. In this non-limiting example, a downlink phased array 44 and an uplink phased array 46 are configured at a central location on the earth deck 22, as shown, and can be used for beam steering downlink signals and uplink signals, respectively, as is well understood by those skilled in the art. Additional antennas on the earth deck 22 may include three cross-link dish antennas 48, 50 and 52 for transmitting and receiving signals to and from other spacecraft on orbit. The antenna dishes 48, 50 and 52 are shown in their deployed configuration facing away from the spacecraft 10 in FIG. 1 and their stowed configuration turned inward to reduce the space requirements for launch. Additionally, two gimbal dish antennas 54 and 56 are shown mounted to the earth deck 22 for transmitting and receiving uplink and downlink signals at a different frequency band than the phased arrays 44 and 46.

As mentioned above, the mounting cylinder 14 allows the spacecraft 10 to be mounted to other spacecraft in a single launch fairing to be launched for deployment in orbit around the Earth. FIG. 3 is an isometric view of a launch vehicle 60 including an engine section 62, a launch fairing 64 and a nose cone 66. The spacecraft 10 is mounted to two other identical three-axis spacecrafts by securing the flange 16 or 18 of the spacecraft 10 to an identical flange of an adjacent spacecraft. As is well understood by those skilled in the art, any suitable device for securing the flanges of adjacent spacecraft together can be used, such as exploding bolts, to separate the spacecraft 10 once the launch vehicle 60 is on or near the appropriate orbit for the deployment spacecraft 10. As is apparent, the axis of the cylinders 14, i.e., the east/west Z-axis, is in the same direction as the launch velocity vector of the launch vehicle 60, where the earth deck 22 is perpendicular to the velocity vector, contrary to the known stackable spacecrafts where the earth deck 22 faces the velocity vector of the launch vehicle 60.

Figure 5:
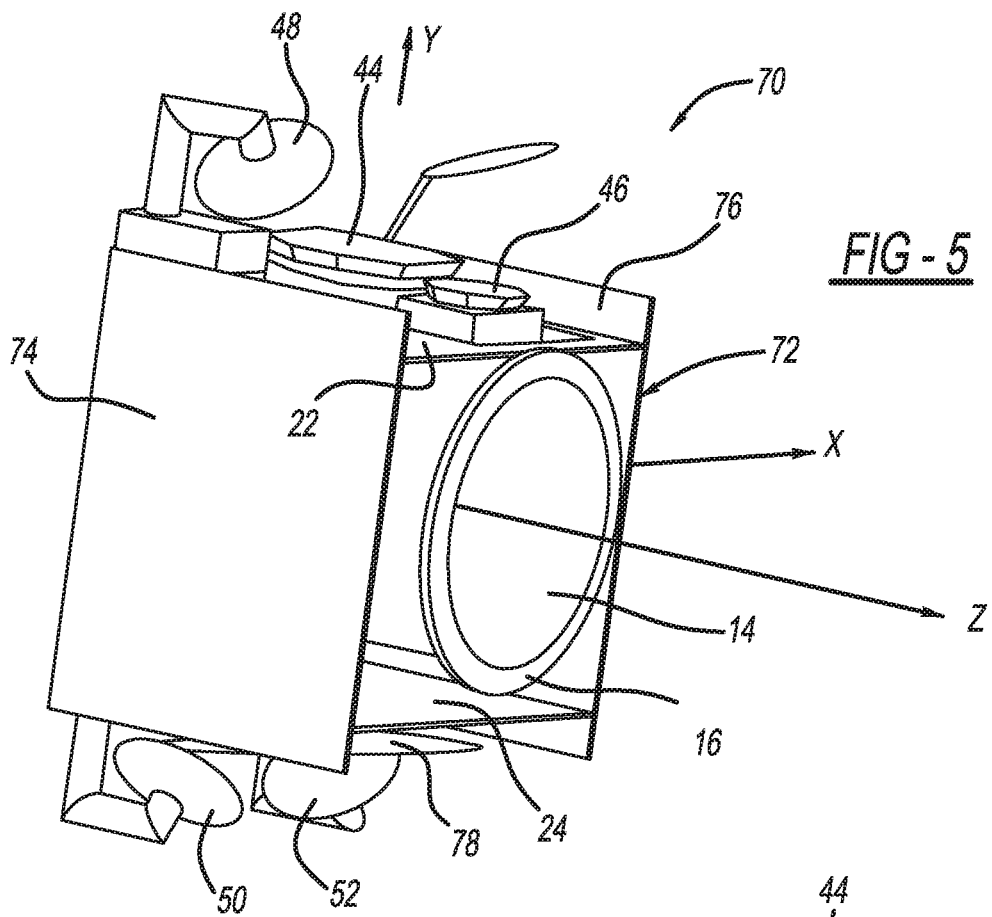
FIG. 5 is an isometric view of the spacecraft shown in FIG. 4 in a stowed configuration.

The discussion above of the spacecraft 10 is merely representative of one possible configuration of the elements that may be included in a modern three-axis spacecraft, where the configuration of the various components discussed herein can be varied within the scope of the present invention. FIG. 4 is an isometric view of a three-axis spacecraft 70 in a deployed configuration and FIG. 5 is an isometric view of the spacecraft 70 in a stowed configuration, where like elements to the spacecraft 10 are identified by the same reference number. The illustrations of the spacecraft 70 are specifically intended to show antenna being deployed off of the sides of the spacecraft 70, which may require the antenna to be deployed from the zenith deck 24. The spacecraft 70 includes a spacecraft body 72 having a slightly different shape and size than the spacecraft body 12, but still having six sides including the earth deck 22 and the zenith deck 24. Further, the thermal radiator panels 38 and 40 have been replaced with thermal radiator panels 74 and 76 having a larger size than the panels 38 and 40 to show that different spacecraft have different heat removal requirements. It is noted that the solar panels 38 and 40 have been removed merely for clarity purposes. In this configuration, the phased arrays 44 and 46 and the cross-link antenna dish 48 are still mounted to the earth deck 22, but the antenna dishes 50 and 52 are mounted to the zenith deck 24. Further, a con-focal main reflector 78 is mounted to the zenith deck 24 and a con-focal sub-reflector 80 is mounted to the earth deck 22.

Figure 6:
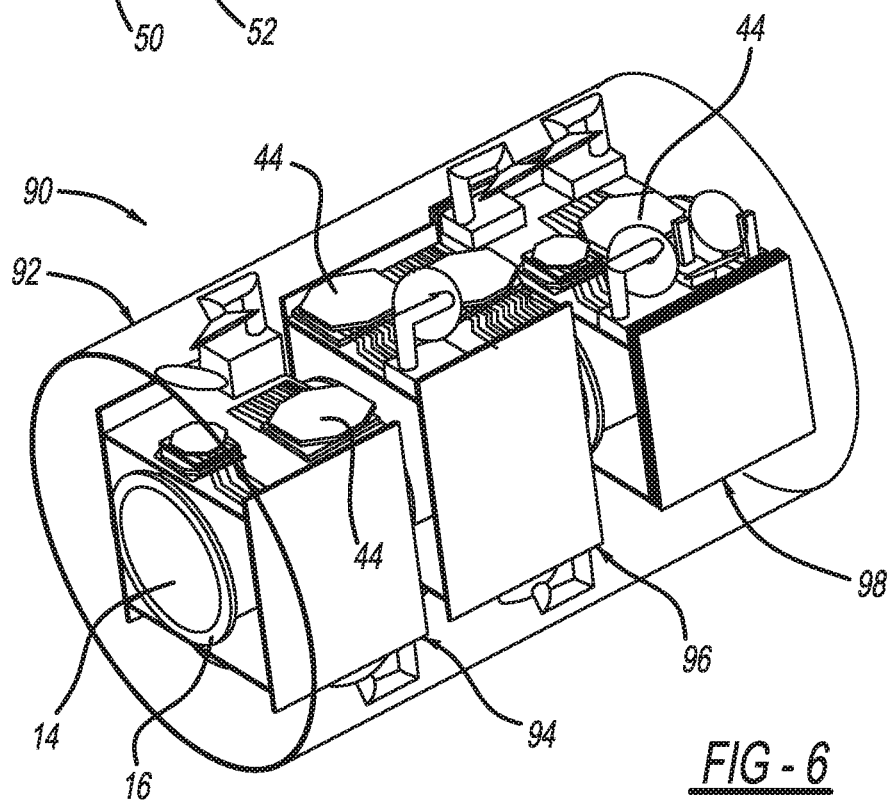
FIG. 6 is an isometric view of a plurality of spacecraft stacked in a stowed configuration in a launch fairing.

FIG. 6 is an isometric view showing a launch fairing 92 for a launch vehicle 90 and including three spacecraft 94, 96 and 98 mounted therein for launch, where the cylinders 14 of adjacent spacecraft are coupled together in the manner discussed above. FIG. 6 is intended to illustrate that different three-axis spacecraft can be stacked together in a common launch fairing, where the spacecraft may have different sized thermal radiator panels, different sized earth decks, different components, different configuration of antennas, etc. For example, the spacecraft 94 may be a medium power geostationary orbit spacecraft configured with a con-focal uplink phased array, the spacecraft 96 may be a high power geostationary orbit spacecraft configured with multi-beam downlink phased arrays and high gain multi-beam uplink phased arrays, and the spacecraft 98 may be a low power high earth orbit or geostationary orbit spacecraft.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A three-axis spacecraft comprising:
a spacecraft body being rectangular in shape and including first and second opposing radiator/equipment panels, first and second opposing mounting panels, an earth deck thermally coupled to the first radiator/equipment panel and a zenith deck thermally coupled to the second radiator/equipment panel, wherein the first and second radiator/equipment panels face a north and south direction relative to the Earth when the spacecraft is on orbit, the first and second mounting panels face an east and west direction relative to the Earth when the spacecraft is on orbit, the earth deck faces the Earth when the spacecraft is on orbit, and the zenith deck faces away from the Earth when the spacecraft is on orbit;
a plurality of antennas mounted to the earth deck; and
a mounting cylinder extending through the spacecraft body and out of the first and second mounting panels, wherein the mounting cylinder includes a mounting flange at each end of the cylinder and being operable to be mounted to a mounting flange of a mounting cylinder of other spacecraft.

2. The spacecraft according to claim 1 further comprising a first solar panel mounted to the first radiator/equipment panel and extending therefrom and a second solar panel mounted to the second radiator/equipment panel and extending therefrom.

3. The spacecraft according to claim 1 wherein the plurality of antennas mounted to the earth deck include at least one phased array.

4. The spacecraft according to claim 3 wherein the at least one phased array includes a downlink phased array and an uplink phased array.

5. The spacecraft according to claim 1 wherein the plurality of antennas mounted to the earth deck include at least one cross-link antenna.

6. The spacecraft according to claim 5 wherein the at least one cross-link antenna includes a plurality of cross-link antennas.

7. The spacecraft according to claim 1 wherein the plurality of antennas mounted to the earth deck includes at least one gimbal dish antenna.

8. The spacecraft according to claim 1 further comprising at least one antenna mounted to the zenith deck.

9. The spacecraft according to claim 1 further comprising one or more con-focal reflectors mounted to one or both of the earth deck or the zenith deck.

10. The spacecraft according to claim 1 wherein the spacecraft is selected from the group consisting of medium power geostationary orbit spacecraft, high power geostationary orbit spacecraft and low power geostationary orbit spacecraft.

11. The spacecraft according to claim 1 wherein the spacecraft is configured to be mounted in a three spacecraft stack operable to be mounted in a single launch fairing.

12. A three-axis geostationary orbit spacecraft comprising:
a spacecraft body being rectangular shape and including first and second opposing radiator/equipment panels, first and second opposing mounting panels, an earth deck and a zenith deck, wherein the first and second radiator/equipment panels face a north/south X-direction relative to the Earth when the spacecraft is on orbit, the first and second mounting panels face an east/west Z-direction relative to the Earth when the spacecraft is on orbit, the earth deck faces the Earth when the spacecraft is on orbit, and the zenith deck faces away from the Earth when the spacecraft is on orbit;
a first solar panel mounted to the first radiator/equipment panel and extending therefrom and a second solar panel mounted to the second radiator/equipment panel and extending therefrom;
a plurality of phased arrays mounted to the earth deck;
a plurality of cross-link antennas mounted to the earth deck; and
a mounting cylinder extending through the spacecraft body and out of the first and second mounting panels, wherein the mounting cylinder includes a mounting flange at each end of the cylinder that are operable to be mounted to a mounting flange of a mounting cylinder of an adjacent spacecraft.

13. The spacecraft according to claim 12 wherein the plurality of phased arrays include a downlink phased array and an uplink phased array.

14. The spacecraft according to claim 12 wherein the plurality of plurality of phased arrays include at least one gimbal dish antenna.

15. The spacecraft according to claim 12 further comprising at least one antenna mounted to the zenith deck.

16. The spacecraft according to claim 12 further comprising one or more con-focal reflectors mounted to one or both of the earth deck and the zenith deck.

17. The spacecraft according to claim 12 wherein the spacecraft is selected from the group consisting of medium power geostationary orbit spacecraft, high power geostationary orbit spacecraft and low power geostationary orbit spacecraft.

18. A three-axis spacecraft comprising a spacecraft body including first and second opposing mounting panels that face an east and west direction relative to the Earth when the spacecraft is on orbit, an earth deck that faces the Earth when the spacecraft is on orbit and a zenith deck that faces away from the Earth when the spacecraft is on orbit, said spacecraft further comprising a mounting cylinder extending through the spacecraft body and out of the first and second opposing mounting panels.

19. The spacecraft according to claim 18 further comprising a plurality of antennas mounted to the earth deck that include at least one phased array.

20. The spacecraft according to claim 18 further comprising at least one antenna mounted to the zenith deck.

* * * * *